(No Model.) 6 Sheets—Sheet 1.

A. NIGGLI & S. LAMBERT.
SCREW CUTTING MACHINE.

No. 585,849. Patented July 6, 1897.

WITNESSES
H. N. Jenkins
Jno. A. Richmond

INVENTORS:
A. Niggli
S. Lambert
by G. Gittman
Attorney (No Model.)  6 Sheets—Sheet 2.
A. NIGGLI & S. LAMBERT.
SCREW CUTTING MACHINE.
No. 585,849.  Patented July 6, 1897.
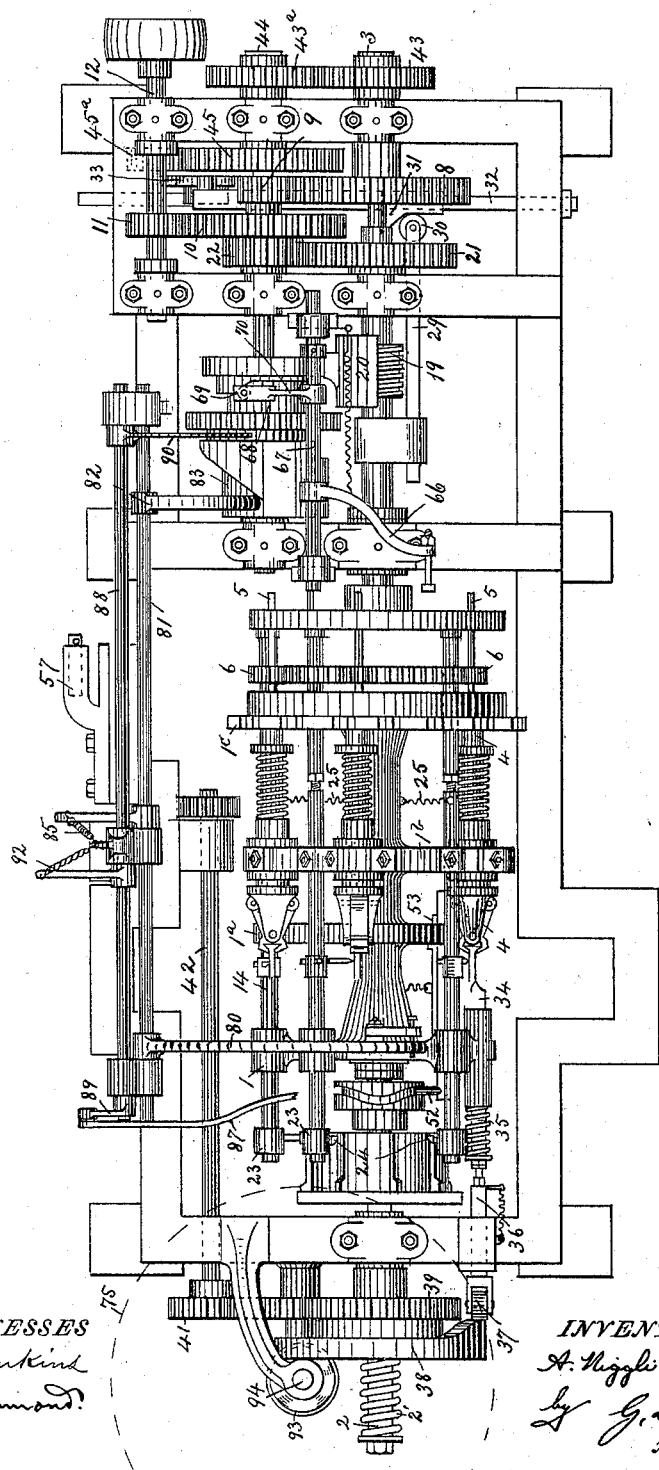
Fig. 1.ˣ
WITNESSES
H. N. Jenkins
Jas. A. Richmond
INVENTORS
A. Niggli & S. Lambert
by G. Dittmar,
Attorney (No Model.)  6 Sheets—Sheet 3.
A. NIGGLI & S. LAMBERT.
SCREW CUTTING MACHINE.
No. 585,849.  Patented July 6, 1897.
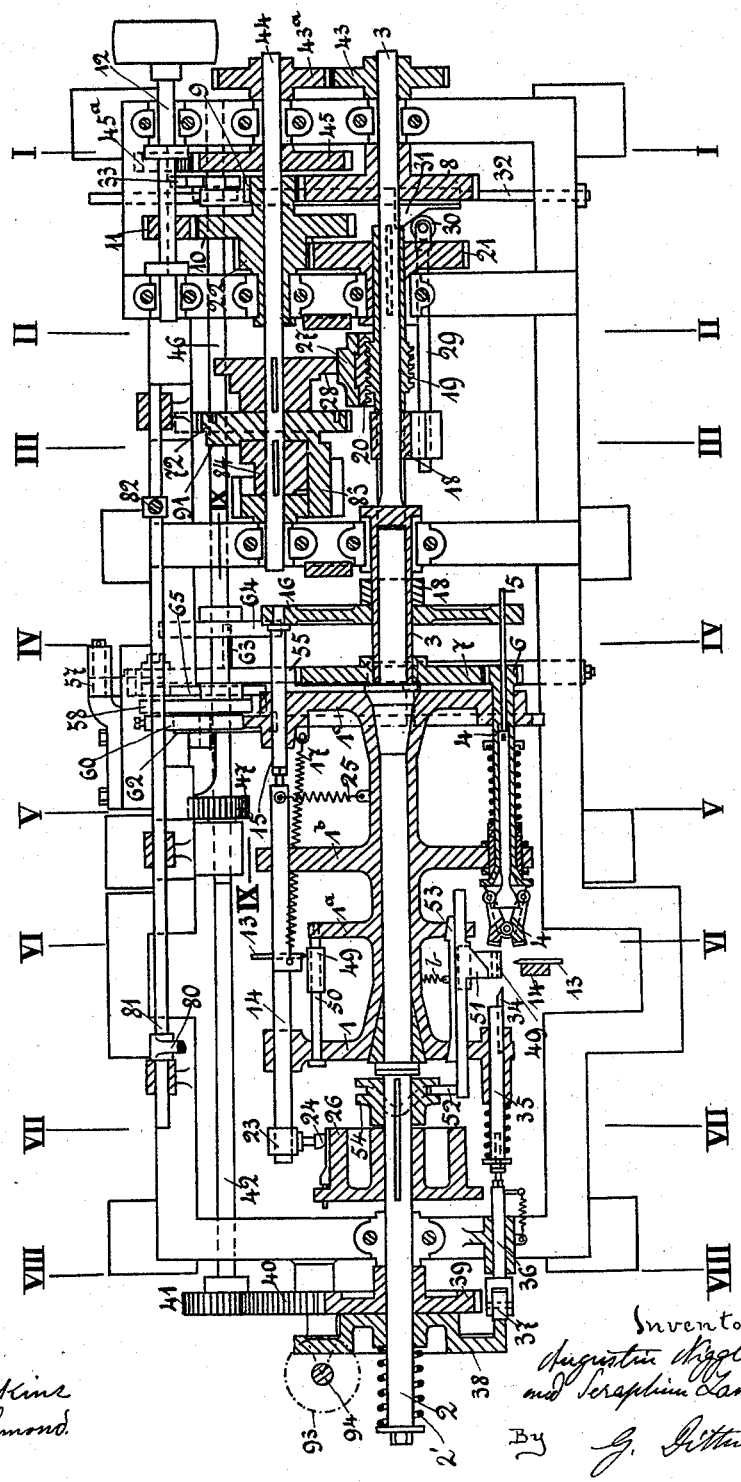
Witnesses
H. N. Jenkins
Jas. A. Richmond
Inventors
Augustin Niggli
and Seraphin Lambert
By G. Dittman
Attorney
THE NORRIS PETERS CO., PHOTO-LITHO., WASHINGTON, D. C.

(No Model.) 6 Sheets—Sheet 4.

A. NIGGLI & S. LAMBERT.
SCREW CUTTING MACHINE.

No. 585,849. Patented July 6, 1897.

WITNESSES
H. N. Jenkins
Jas. A. Richmond

INVENTORS:
A. Niggli & S. Lambert
by G. Dittmar
Attorney.

(No Model.) 6 Sheets—Sheet 5.
A. NIGGLI & S. LAMBERT.
SCREW CUTTING MACHINE.
No. 585,849. Patented July 6, 1897.
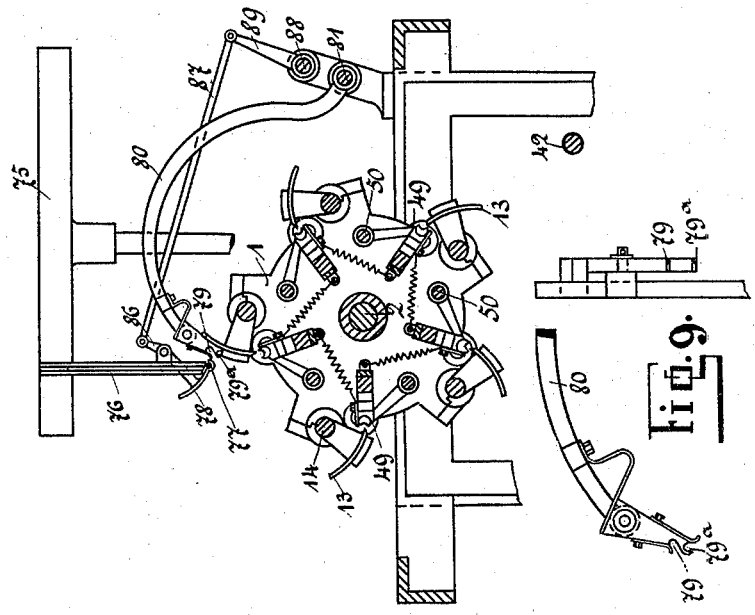
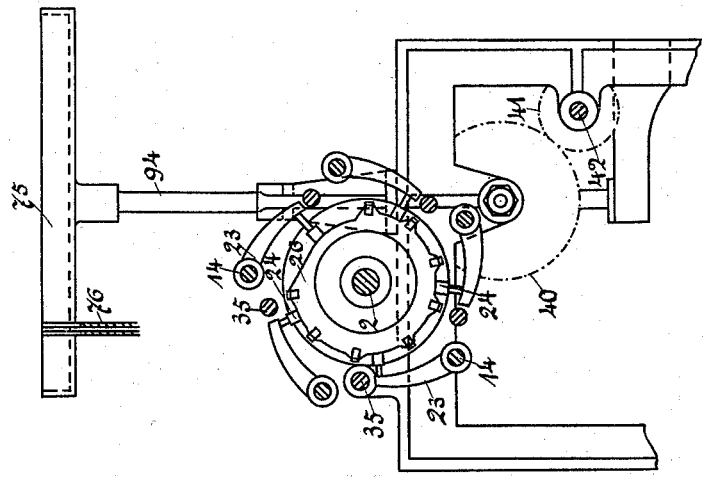
Witnesses.
H. N. Jenkins
Jas. A. Richmond
Inventors
Augustin Niggli
and Seraphin Lambert
G. Dittmar
Attorney
THE NORRIS PETERS CO., PHOTO-LITHO., WASHINGTON, D. C.

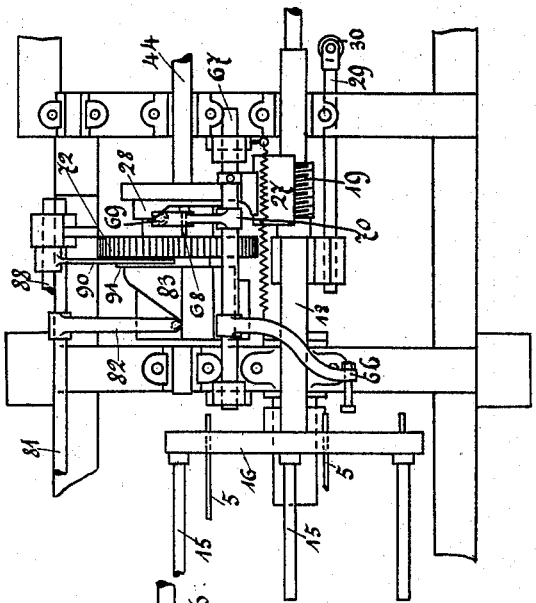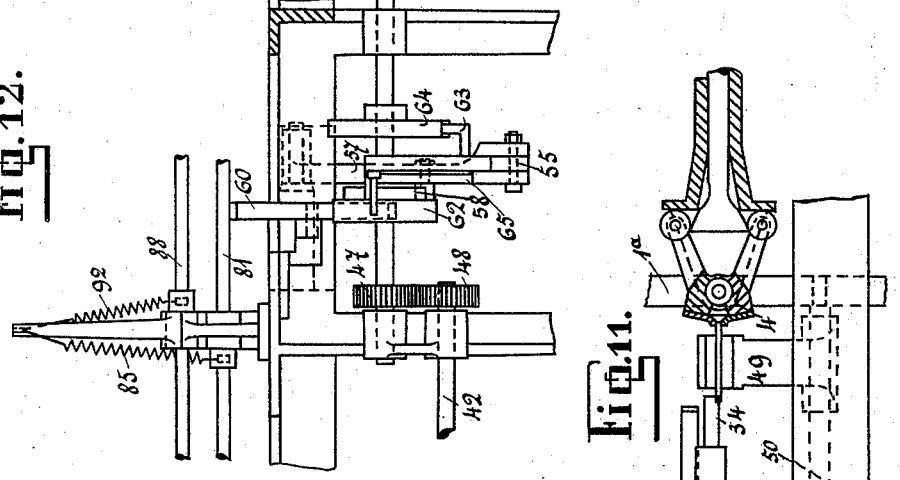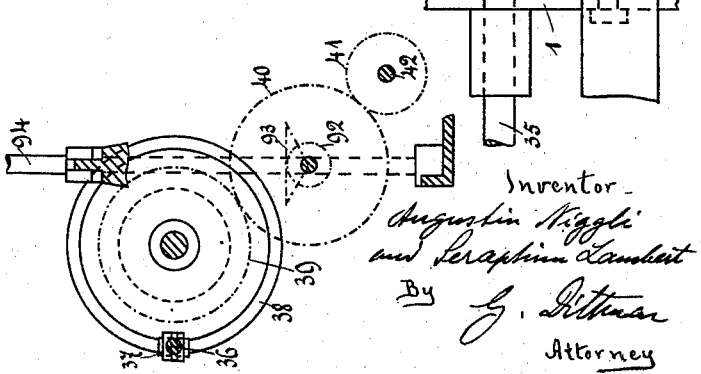

UNITED STATES PATENT OFFICE.

AUGUSTIN NIGGLI, OF BÖZINGEN, AND SERAPHIM LAMBERT, OF GRENCHEN, SWITZERLAND.

SCREW-CUTTING MACHINE.

SPECIFICATION forming part of Letters Patent No. 585,849, dated July 6, 1897.

Application filed October 28, 1895. Serial No. 567,137. (No model.) Patented in Switzerland May 6, 1895, No. 10,191, and in Belgium July 31, 1895, No. 116,506.

*To all whom it may concern:*

Be it known that we, AUGUSTIN NIGGLI, residing at Bözingen, near Biel, and SERAPHIM LAMBERT, residing at Grenchen, canton of Soleure, Switzerland, citizens of the Republic of Switzerland, have invented certain new and useful Improvements in Screw-Cutting Machines, (for which we have obtained patents in Switzerland, No. 10,191, dated May 6, 1895, and in Belgium, No. 116,506, dated July 31, 1895;) and we do hereby declare the following to be a full, clear, and exact description of the invention, such as will enable others skilled in the art to which it appertains to make and use the same.

This invention relates to that class of screw-cutting machines which are especially designed for cutting wood-screws; and our improvements consist in providing means for automatically feeding the screw-blanks, operating the clamping devices and cutting-tools, and discharging the screws after same have been threaded and pointed, as hereinafter fully set forth and specifically claimed.

Figure 1:
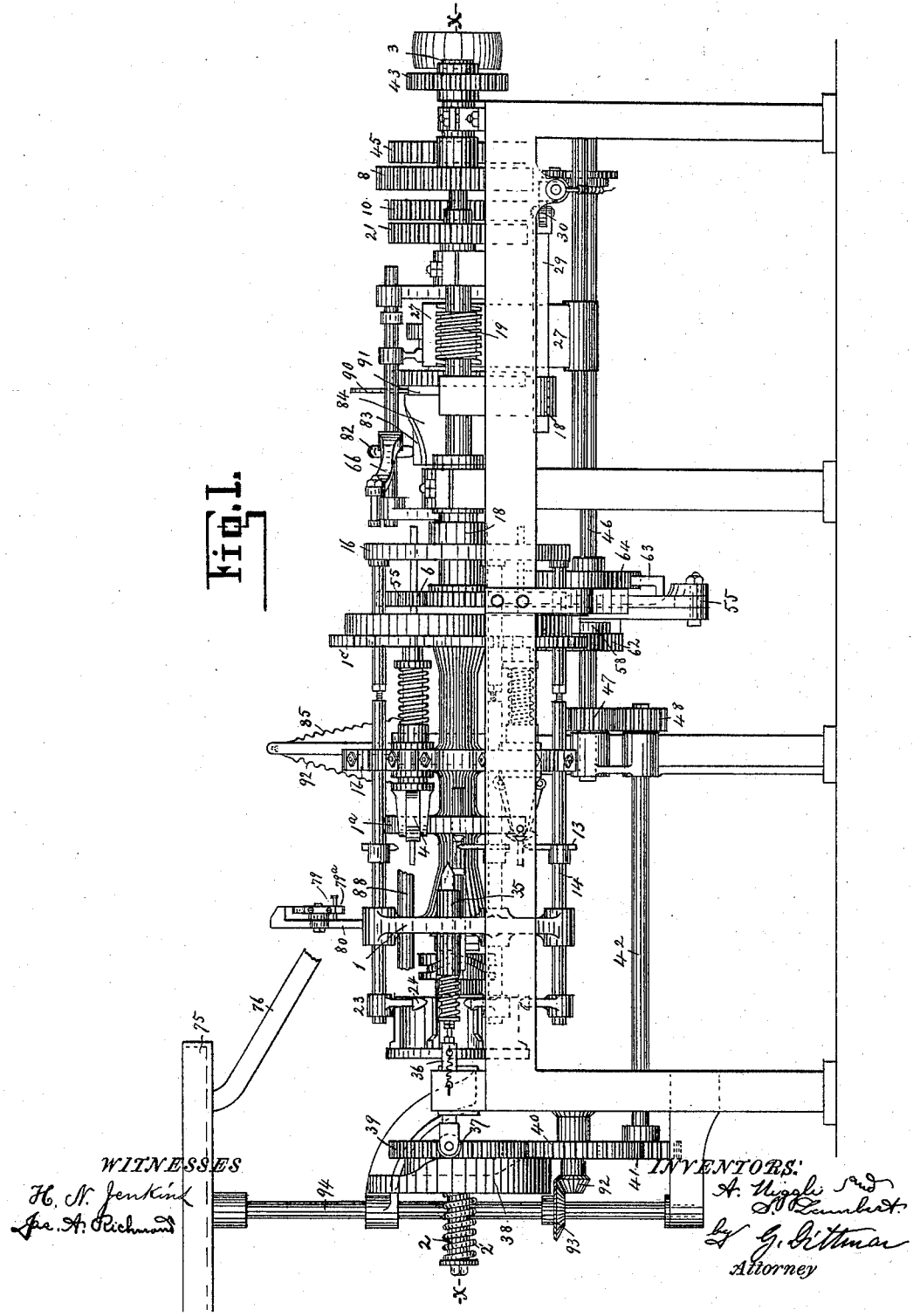
Figure 2:
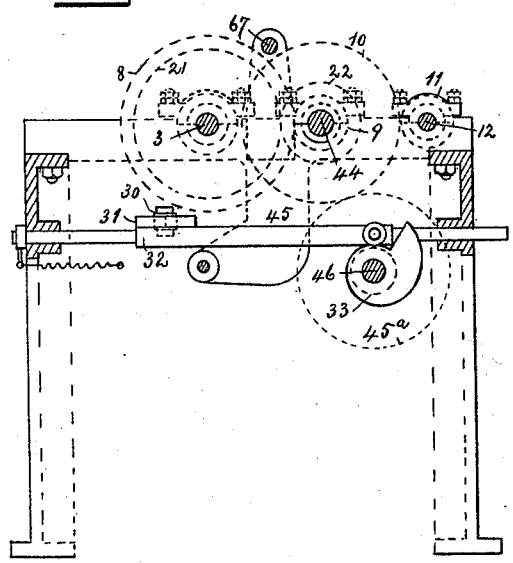
Figure 4:
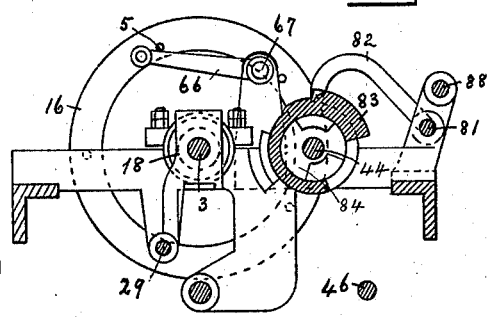

Referring to the accompanying drawings, Figure 1 is a side elevation of the machine. Fig. $1^\times$ is a plan or top view thereof. Fig. $1^{\times\times}$ is a horizontal longitudinal section through the line $x\,x$ of Fig. 1. Figs. 2, 3, 4, 5, and 6 are transverse sections through the lines I I to V V, respectively. Fig. 7 is a cross-section of the tool and clamp holder, the cut being made in front of the flange $1^a$ thereof. Figs. 8, 9, and 10 are transverse sections showing the relative arrangement of parts through lines VI VI, VII VII, and VIII VIII, respectively, of Fig. $1^{\times\times}$. Fig. 11 is a top view of parts between the lines I I and IV IV of Fig. $1^{\times\times}$. Fig. 12 is a vertical longitudinal section at IX IX (between the lines IV and VI) of Fig. $1^{\times\times}$. Fig. 13 is an enlarged view, partly in section, of the clamping devices and parts adjacent thereto.

The frame of the machine is provided with a fixed shaft 2, upon which is fitted a revolving holder, consisting of a sleeve having flanges 1, $1^a$, $1^b$, and $1^c$, within which the clamping devices and tool-holders are adapted to operate. The clamping devices 4, of ordinary construction, are journaled in the flanges $1^b$ $1^c$ of the holder, their rear ends being provided with pinions 6, which are engaged by a cog-wheel 7, secured on the hollow end of a shaft 3, the said hollow end of shaft 3 being adapted to operate on the rearwardly-projecting end of the fixed shaft 2, as shown in Fig. $1^{\times\times}$.

Each clamping device 4 is provided with a spring-actuated mandrel 5, by which it is opened or closed, as hereinafter described. Rotary motion is imparted to the said clamping devices through pinions 6, cog-wheel 7, and shaft 3 from the driving-shaft 12 and intermediate shaft 44 through the matching gear-wheels 8 and 9, 10 and 11.

The screw-cutting tools 13 are adjustably secured to the rods 14, which are fitted in the flanges 1 and $1^b$ of the revolving holder, so as to have a turning and endwise movement therein. The rods 14 are displaced axially toward the feed end of the machine by the pins 15 of the adjustable disk 16, and in opposite direction the displacement is effected by means of the spring 17, whereby they are connected with the flange $1^c$, through which flange the pins 15 are guided, as shown in Fig. $1^{\times\times}$.

The disk 16 is displaced axially by a carriage 18 on the shaft 3 through the instrumentality of a worm 19, likewise on the shaft 3, and a rack 20, which is adapted to engage same.

Motion is imparted to the worm 19 through the gear-wheel 21, secured on the sleeve thereof, the gear-wheels 22 and 10 of the shaft 44, and the gear-wheel 11 of the driving-shaft 12.

The rack 20, whereby the worm 19 is engaged, is secured to or forms part of a lever 27, which is connected with a shaft 27', so as to be disengaged from the worm by the spring $a$ and thus held until the eccentric 28 shall cause it to again engage the said worm.

The following construction and arrangement of parts are made in order to provide for the proper inward movement of the cutting-tools 13 during the production of the screws. The rods 14 are each provided near their outer ends with an arm 23, having an inwardly-projecting pin 24 for operating against the periphery of the fixed drum 26. Each rod 14 is connected by a spring 25 with the revolving holder, so that the pin 24 at the free end of its arm shall be pressed against the periphery of the drum 26 and in moving around the elevations and depressions thereof shall cause the rod 14 to rock back and forth, and thus bring the cutting-tool thereof in or out of contact with the screw to be operated upon.

During the cutting of the screw-thread the pin 24 rides axially over the corresponding elevations of the drum 26, and therefore the said elevations correspond to the form of the screw. The drum is provided with as many elevations or depressions as are necessary to remove chips to produce the screw, and the distance between the middle of the drum and the outer surface of the elevations corresponds with the thickness of one cut or chip. As soon as a complete cut has been made the rack is disengaged from the worm, and thus held by the spring $a$, when the worm 19, carriage 18, disk 16, and rods 14 return to their normal positions through the influence of the spring 17.

The tool-holders 35, provided with tools 34 for cutting the screw-points, are mounted in the flange 1 of the revolving holder in such manner as to permit of their being displaced axially by means of the spring-actuated rods 36, having a roller 37 at one end thereof and a disk 38, the concentric inclined surface of which is adapted to operate against the aforesaid roller, and thus operate the spring-actuated rod 36 and the tool-holder connected therewith. The disk 38 is loosely fitted on the fixed shaft 2, so as to be turned by means of a cog-wheel 39, also loosely fitted on shaft 2, the two being held in frictional contact by a coil-spring $2'$ at the outer end of said shaft, motion being imparted to the cog-wheel 39 from the shaft 42 through gear-wheels 41 and 40, the latter engaging the wheel 39.

The shaft 42 receives its motion from the shaft 3 through wheel 43 thereof, the wheels $43^a$ and 45 of shaft 44, the wheel $45^a$ of shaft 46, and the engaging wheels 47 and 48 of the shafts 46 and 42, respectively, Figs. $1^{\times\times}$ and 12.

In order to steady the screw-blanks while the thread is being cut thereon, bridges 49 are provided to rest against and partially surround same. These bridges 49 are arranged to turn on pins 50, which are fastened in the disks 1 and $1^a$ of the revolving holder, so as to be pressed by the wedge-shaped parts 51 against the screw to be cut. The said parts 51 have an endwise movement in the aforesaid disks, their positions being regulated by the wedges 53. (Shown in Fig. $1^{\times\times}$.)

The endwise movement of the wedges 51 is effected by means of a cam-disk 54 on the shaft 2, each wedge being provided with a pin 52, which is adapted to operate in the groove of the cam-disk 54. The slow and opposite movement of the bridges is effected by springs $b$ during the backward movement of the wedges 51.

In the arrangement shown in the drawings it is requisite that eight cuts or chips corresponding with the partial revolutions of the revolving holder are necessary for the complete cutting of the thread. The cutting of the screw-points and the insertion and delivery of the screw-blank require two partial revolutions. Thus ten partial revolutions or one complete revolution of the revolving holder is requisite to produce a screw.

Figures 3, 5:
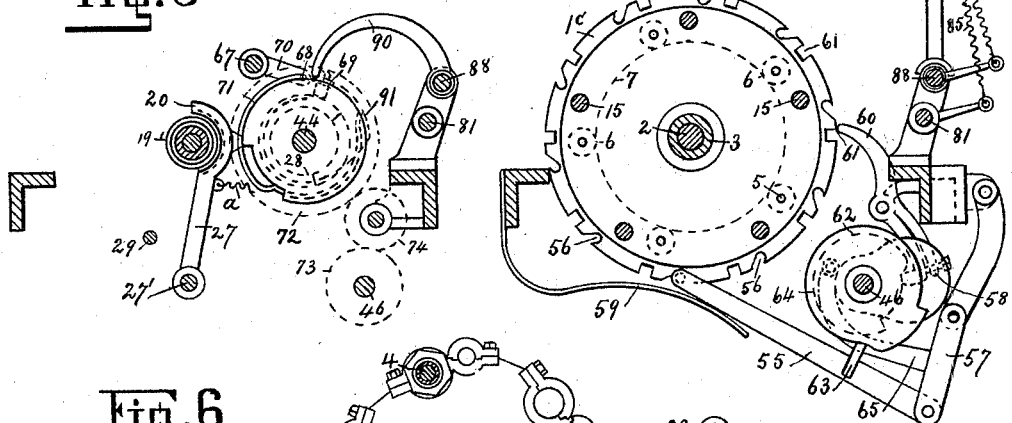
Figure 6:
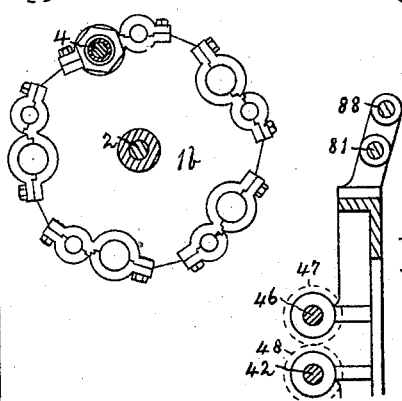

The periodical revolution of the revolving holder is effected by the rod 55, Fig. 5, one end of which is adapted for engaging notches 56 on the rim of the disk $1^c$, the other end being connected with a lever 57, which is actuated by means of a cam 58 on the shaft 46.

The free end of the rod 55 is held in close contact with the rim of the disk $1^c$ by a spring 59, so as to successively engage the notches 56 thereof.

The revolving holder is arrested after each partial revolution by means of a pawl 60, engaging notches 61, also in the rim of the disk $1^c$, the said pawl 60 being actuated by a cam 62, which is keyed to the shaft 46. The moment the revolving holder is arrested by the pawl 60 the rod 55 is disengaged from the corresponding notch 56 by means of a trip 63, secured to the said rod 55, and the cam 64 on shaft 46, and is brought into the following notch 56 of the disk $1^c$ by the arm 65, secured to the lever of and by the eccentric disk 58.

The opening of the clamping devices 4 is effected by an arm 66, secured to a spring-retained sliding shaft 67, having an arm 70, provided with a pin 68 and a friction-roller 69, through which the shaft is moved in opposition to its retaining-spring by reason of the beveled portion of the disk 28 being brought in contact therewith, which movement causes the outer end of the arm 66 to exert sufficient pressure upon the corresponding mandrel 5 of the clamping device 4 to open same.

As the clamping devices must be opened at each two-tenths revolution of the revolving holder and as the disk 28 makes a full revolution to each one-tenth revolution of the revolving holder, the arm 70 (see Fig. 3) is guided by its pin 68 in the groove 71 of the wheel 72. This prevents too early an opening of the clamping devices, for in this way the roller 69 can only come in contact with the beveled part of the disk 28 at every second revolution of same, which action effects the movement of the shaft 67 and arm 66, as required. Motion is imparted to the wheel 72 from the shaft 46 through the wheels 73 and 74. (See Fig. 3.)

The blanks from which the screws are to be made are transferred in the well-known manner from the turning plate 75, Figs. 7 and 8, into the pipe or channel 76, where they rest one upon the other. Thus the blanks are successively fed into the chute 77 of a cup 78, which moves back and forth, so as to close the channel 76.

Each time that a blank is to be fed toward a clamping device the cup 78 is moved inward and the blank is taken up from the chute 77 by the upper gripper 79, secured to the pivoted arm 80, which also has a horizontal movement. The screw-blanks are thus brought before their respective clamping devices. The finished screw in the same clamping device is seized by the lower gripper 79ª, also secured to the arm 80, after the receding of the corresponding bridge and taken out of the clamping device, whereupon the upper gripper 79 places the uncut screw into same and the arm 80, carrying the lower gripper, returns with the finished screw into its original position, and in doing so drops the said screw into a receiving box or chute.

The arm 80 is secured to the shaft 81, which has a sliding and a rocking motion obtained through an arm 82, which is also secured to the said shaft 81. The free end of the arm 82 is adapted to slide alternately upon two disks 83 and 84, one within the other and turning in opposite directions with an unequal number of revolutions, the exterior disk 83 receiving motion from the wheel 72, while the interior disk receives motion from the shaft 44.

The main form of the disk 83 is that of a hollow cylinder with an inclined rib on the outer surface thereof, along which the free end of the arm 82 is adapted to slide and thus axially displace its shaft 81 and the arm 80, secured thereon, thus bringing the said arm 80 in front of the cup 78. Further movement of the disk 83 causes the upper gripping device 79 to seize a screw-blank from the cup 78 and the lower gripper to release the finished screw previously taken thereby from one of the clamping devices. The arm 82 and shaft 81 are next moved back to their original positions, thus causing the arm 80 to move from the cup 78 to the front of the clamping devices 4 and deposit therein the screw-blank.

The spring 85, acting on the shaft 81, presses the arm 82 continually against the disks 83 and 84. The cup 78 is moved back and forth by a lever 86, the rod 87, and the arm 89 of shaft 88, which receives motion from an arm 90, being likewise on this shaft, and from the cam 91, connected with the wheel 72. (See Fig. 1.)

The spring 92, Fig. 12, acting on the shaft 88, presses the arm 90 continually upon the rim of the cam 91.

The screw-blanks are fed from the turning plate 75 into the feed pipe or channel 76, as in other machines, by a rake or sweep, (not shown,) which is connected with the upper end of a vertical shaft 94. The said shaft is driven by the bevel-wheels 93 and 92 and the gear-wheels 40 and 41, the latter connected with the shaft 42, through which the motion is obtained.

The operation of the machine is as follows: The upper gripper 79 on arm 80 (see Figs. 8 and 14) takes from the chute 77 of the cup 78, when moved inwardly, a screw-blank and conveys same to the front of the clamping device 4, which, in being opened by the action of the mandrel 5, permits the lower gripper 79ª to remove the finished screw therefrom, whereupon the upper gripper 79 deposits its screw-blank in the said clamping device and the arm 80 returns to its normal position. The revolving holder now makes one-tenth of a revolution, and during its pause the bridge 49 is brought against the screw-blank in the clamping device and bears against same. The requisite cutter for the point is then pressed forward and after cutting the screw-point returns to its original position. The revolving holder now turns for the second tenth part of a revolution, but before completing same a cutting-tool moves against the screw-blank and cuts therefrom the first chip. As this is being done the revolving holder turns another one-tenth part of a revolution, during which time the thread-cutter returns, through the action of its spring, into its cutting position and a second row of chips is removed. Thus the operation continues until eight rows of chips have been cut. During this time the revolving holder has made ten times one-tenth part of a revolution, or one complete revolution, the bridge returning, through the action of its springs, during the last part of the revolution.

As this machine cuts simultaneously a number of screws, its effectiveness is far greater than that of any known apparatus for a like purpose. It will be seen that its working capacity can be greatly increased by simply applying a greater number of clamping devices and cutting-tools thereto.

Having described our invention, what we claim as new, and desire to secure by Letters Patent, is—

1. In a screw-cutting machine, the combination of a fixed shaft, a holder adapted to revolve thereon, the said holder provided with disks 1, 1ª, 1ᵇ and 1ᶜ, with clamping devices for the screw-blanks, a series of tools for cutting the screw-points and a series of tools for cutting the screw-thread, the clamps and tools for cutting the screw points and thread connected with the disks of the revolving holder, and adapted to operate, substantially as and for the purpose set forth.

2. In a screw-cutting machine, the combination of a fixed shaft and a sleeve adapted to revolve thereon, the said sleeve provided with flanges having clamping devices and tool-holders fitted therein, each clamping device provided with a pinion and a spring-actuated mandrel, as described, a shaft having a hollow end adapted to fit the rear end of the fixed shaft, and revolve thereon, a gear-wheel engaging the pinions of the clamping devices, the sliding disk 16 provided with pins 15, the rods 14 carrying cutting-tools and having adjustable arms, the drum 26 for adjusting said arms, and the springs 17 and 25, substantially as set forth.

3. In a screw-cutting machine, the combination of a fixed shaft, a holder provided with clamping devices and screw-cutting tools, adapted to operate on the fixed shaft, a stationary drum having a series of elevations thereon, as described, the thread-cutters 13, and rods 14, each rod having an arm 23 and a pin 24, with the spring 25, whereby the cutter is automatically controlled substantially as set forth.

4. In a screw-cutting machine, the combination of the carriage 18, rod 29, and roller 30, as described, with the cam 33, and the spring-actuated rod 32 having an inclined plane 31, connected therewith, substantially as and for the purpose set forth.

5. The combination in a screw-cutting machine, having a revolving holder provided with disks 1 and 1ª, the pins 50 and bridges 49, the wedge-shaped parts 51 adapted to slide in slots in the aforesaid disks, and the regulating-wedges 53, substantially as and for the purpose set forth.

6. In a screw-cutting machine, the combination of a revolving holder, a series of clamping devices, and cutting-tools connected therewith, as described, with the worm 19, and nut 20, the carriage 18 and disk 16, pins 15 connected with said disk, the rods 14 provided with tools 13, and the springs 17, substantially as and for the purpose set forth.

In testimony whereof we affix our signatures in presence of two witnesses.

AUGUSTIN NIGGLI.
SERAPHIM LAMBERT.

Witnesses:
 C. HANSLIN,
 G. SULZBERGER.